(12) United States Patent
Hui

(10) Patent No.: US 7,909,351 B2
(45) Date of Patent: Mar. 22, 2011

(54) TRAILER COUPLING DOCK THEFT-PROOF LOCK

(75) Inventor: Hsai Chin Hui, Chang Hua (TW)

(73) Assignee: Handyway Co., Ltd., Chang Hua (TW)

( * ) Notice: Subject to any disclaimer, the term of this patent is extended or adjusted under 35 U.S.C. 154(b) by 0 days.

(21) Appl. No.: 12/193,090

(22) Filed: Aug. 18, 2008

(65) Prior Publication Data

US 2010/0244407 A1  Sep. 30, 2010

(51) Int. Cl.
*B60D 1/60* (2006.01)
(52) U.S. Cl. ........ 280/507; 280/504; 280/506; 280/511; 280/512
(58) Field of Classification Search .................. 280/504, 280/506, 507, 511, 512; 70/258
See application file for complete search history.

(56) References Cited

U.S. PATENT DOCUMENTS

| 3,780,546 | A | * | 12/1973 | Longenecker | 70/58 |
| 3,977,221 | A | * | 8/1976 | Foote | 70/58 |
| 5,087,064 | A | * | 2/1992 | Guhlin | 280/507 |
| 6,412,314 | B1 | * | 7/2002 | Jenks | 70/14 |
| 6,908,098 | B2 | * | 6/2005 | Milazzo | 280/511 |
| 7,469,919 | B2 | * | 12/2008 | Kalous et al. | 280/507 |
| D615,462 | S | * | 5/2010 | Barrette | D12/162 |
| 2007/0069501 | A1 | * | 3/2007 | Hsai | 280/507 |
| 2009/0079163 | A1 | * | 3/2009 | Cuellar et al. | 280/507 |
| 2009/0200771 | A1 | * | 8/2009 | Prine | 280/507 |

* cited by examiner

*Primary Examiner* — Joanne Silbermann
*Assistant Examiner* — Tashiana Adams
(74) *Attorney, Agent, or Firm* — Guice Patents PLLC

(57) ABSTRACT

A trailer coupling dock theft-proof lock to prevent unauthorized coupling and hauling of a trailer during parking includes a locking dock, a coupling assembly and a lock assembly. The coupling assembly can be latched in a dome of a trailer coupling dock. By locking and unlocking of the lock assembly the coupling assembly can be retained or removed so that unauthorized towing of the trailer can be prevented.

6 Claims, 7 Drawing Sheets

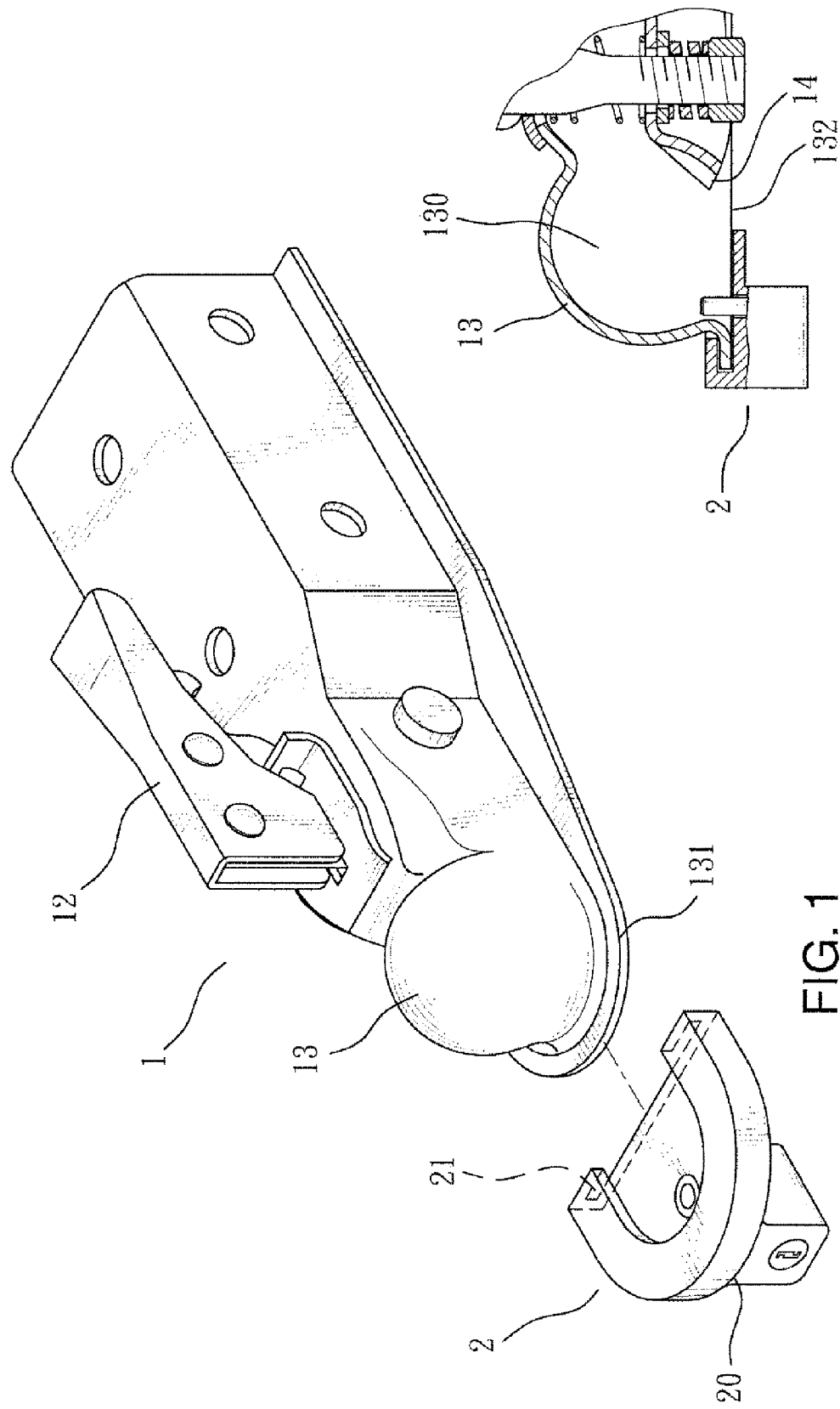

ered corner 414 of the slider 41.

TRAILER COUPLING DOCK THEFT-PROOF LOCK

BACKGROUND OF THE INVENTION

1. Field of the Invention

The present invention relates to a trailer coupling dock theft-proof lock and particularly to a trailer coupling dock theft-proof lock to prevent unauthorized coupling and hauling of a trailer during parking.

2. Description of the Prior Art

A conventional trailer coupling dock 1 such as the one shown in FIGS. 1 and 2 mainly has a handle mechanism 12 to drive a lower latch element 14 located in the coupling dock 1 to allow a dome 13 and a spherical seat on a vehicle to be separated or latched. The latching can be done easily and quickly. Such a convenience creates a problem, namely when a trailer is parked and not being coupled with the vehicle, the coupling dock 1 is open and can be easily latched to the spherical seat of any vehicle and towed away. To remedy this problem a coupling lock 2 has been developed. It has a body 20 to encase a lateral side 131 of the dome 13 and a coupling trough 21 on the body 20 to wedge in the lateral side 131 to block an opening 132 of the dome 13 (referring to FIG. 2). Thus unauthorized towing of the trailer can be prevented.

While the conventional coupling lock 2 can prevent unauthorized latching of the coupling dock 1 when the trailer is not in use, it still has drawbacks in practice, notably:

1. To match different sizes of the coupling dock 1, the conventional coupling lock 2 has to be made in various types and specifications. Production and inventory become a big burden to producers.

2. The size of the opening 132 of the dome 13 varies for different brands and models, and the coupling lock 2 could not always fully close the opening 132. In the event that a small gap is formed, a pilfer can easily access a housing chamber 130 above the opening 132 to tamper the lock and haul the trailer away.

SUMMARY OF THE INVENTION

In view of the aforesaid disadvantages occurred to the conventional techniques, the present invention aims to provide a trailer coupling dock theft-proof lock to prevent a parking trailer from being hauled away without authorization. The theft-proof lock according to the invention includes a locking dock, a coupling assembly and a lock assembly. The coupling assembly is coupled in a dome of a trailer coupling dock, and can be confined by locking or released by unlocking the lock assembly. Thereby unauthorized latching of the trailer coupling dock can be prevented to avoid the trailer from being stolen.

In one aspect the coupling assembly includes a slider and a ball seat which is formed at a size matching the dome of the trailer coupling dock, and can be replaced to mate a corresponding ball seat.

In another aspect the lock assembly has a core, an elastic element and a latch element.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 1 is a schematic view of a conventional coupling dock and a coupling lock.

FIG. 2 is a fragmentary sectional view of a conventional coupling dock and a coupling lock in a locking condition.

DESCRIPTION OF THE PREFERRED EMBODIMENT

Figure 3:
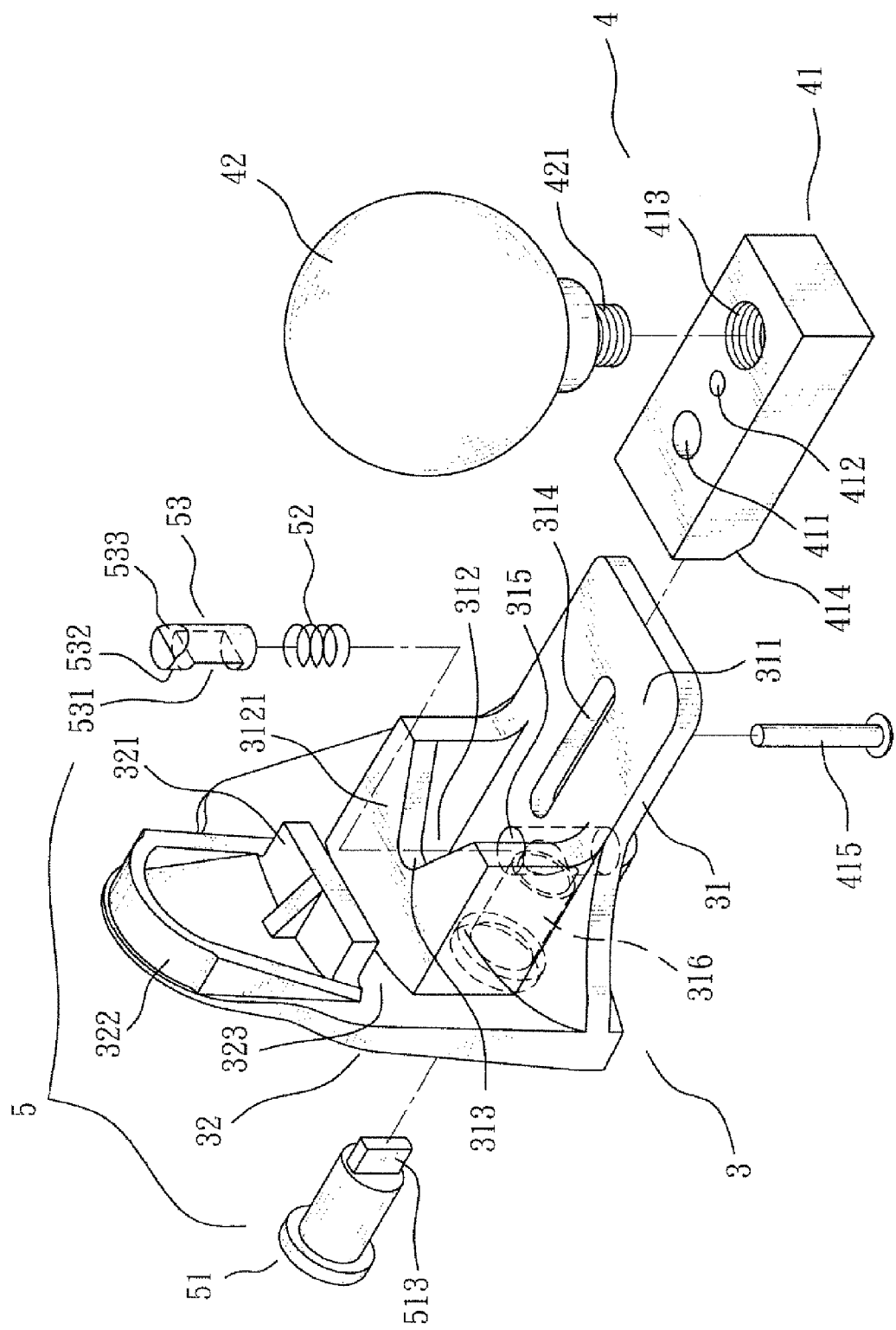
FIG. 3 is an exploded view of the invention.
Figure 5:
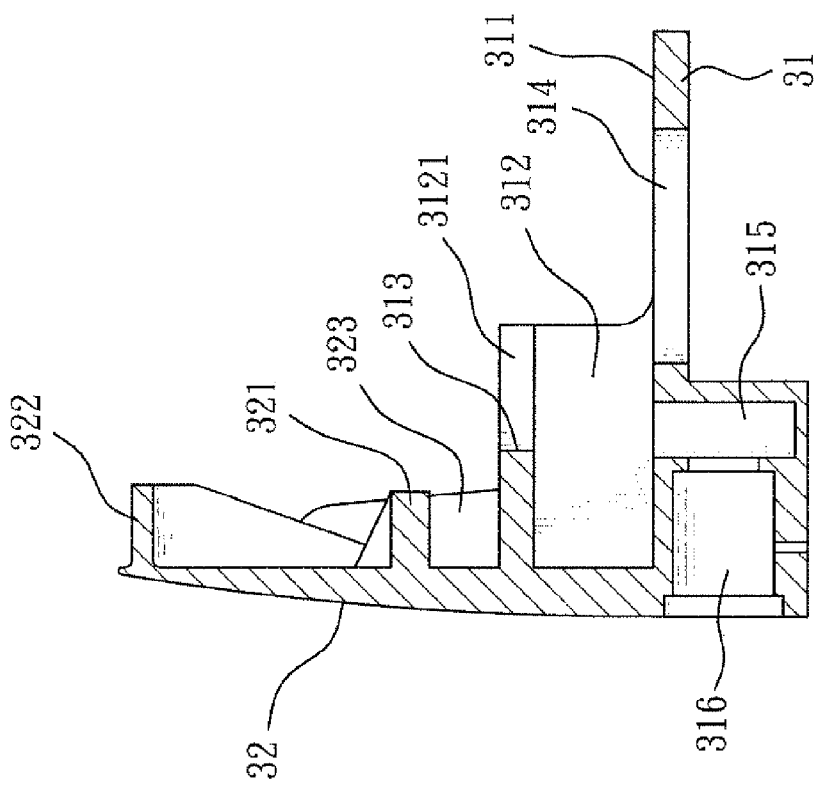
FIG. 5 is a sectional view of a locking dock of the invention.
Figure 4:
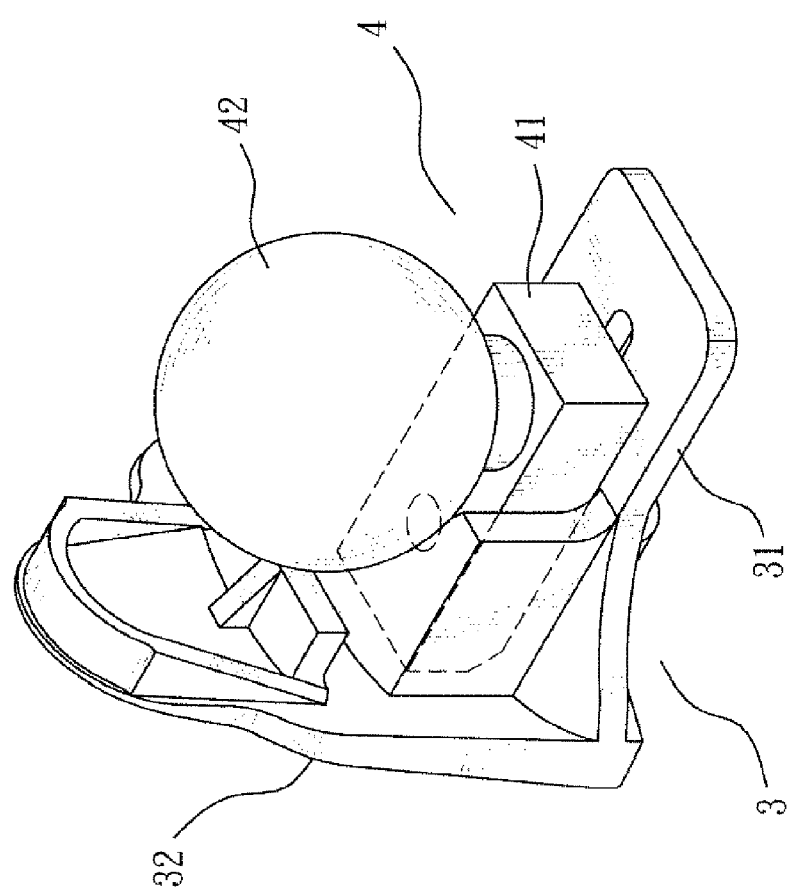
FIG. 4 is a schematic view of the invention in an assembly condition.

Referring to FIGS. 3, 4 and 5, the trailer coupling dock theft-proof lock according to the invention includes a locking dock 3, a coupling assembly 4 and a lock assembly 5.

The locking dock 3 has a body 31 with a deck 311 formed thereon, a slider room 312 formed inside and a plank 3121 located above the slider room 312. The plank 3121 has a notch 313. The deck 311 has a slot 314 and a latch chamber 315. The body 31 has a core chamber 316 at the bottom communicating with the latch chamber 315. The body 31 also has a side wall 32 at one side with a harness flange 321 and a detent rim 322 located thereon. The harness flange 321 and the detent plank 3121 form a coupling space 323 between them. The side wall 32 aims to be pushed by a user for locking when in use.

The coupling assembly 4 includes:

a slider 41 which has at least one latch hole 411, a through hole 412 and a coupling hole 413. The slider 41 also has a chamfered corner 414 at one side and is retained on the locking dock 3 through a pin 415 running through the slot 314 to engage with the through hole 412; and a ball seat 42 which is coupled with the slider 41 and replaceable according to the size of a dome 61 of a coupling dock 6. The ball seat 42 is made at a specification to be held in the dome 61, and has a fastening portion 421 at a lower side to be fastened to the coupling hole 413 of the slider 41 (referring to FIG. 6).

Figure 9:
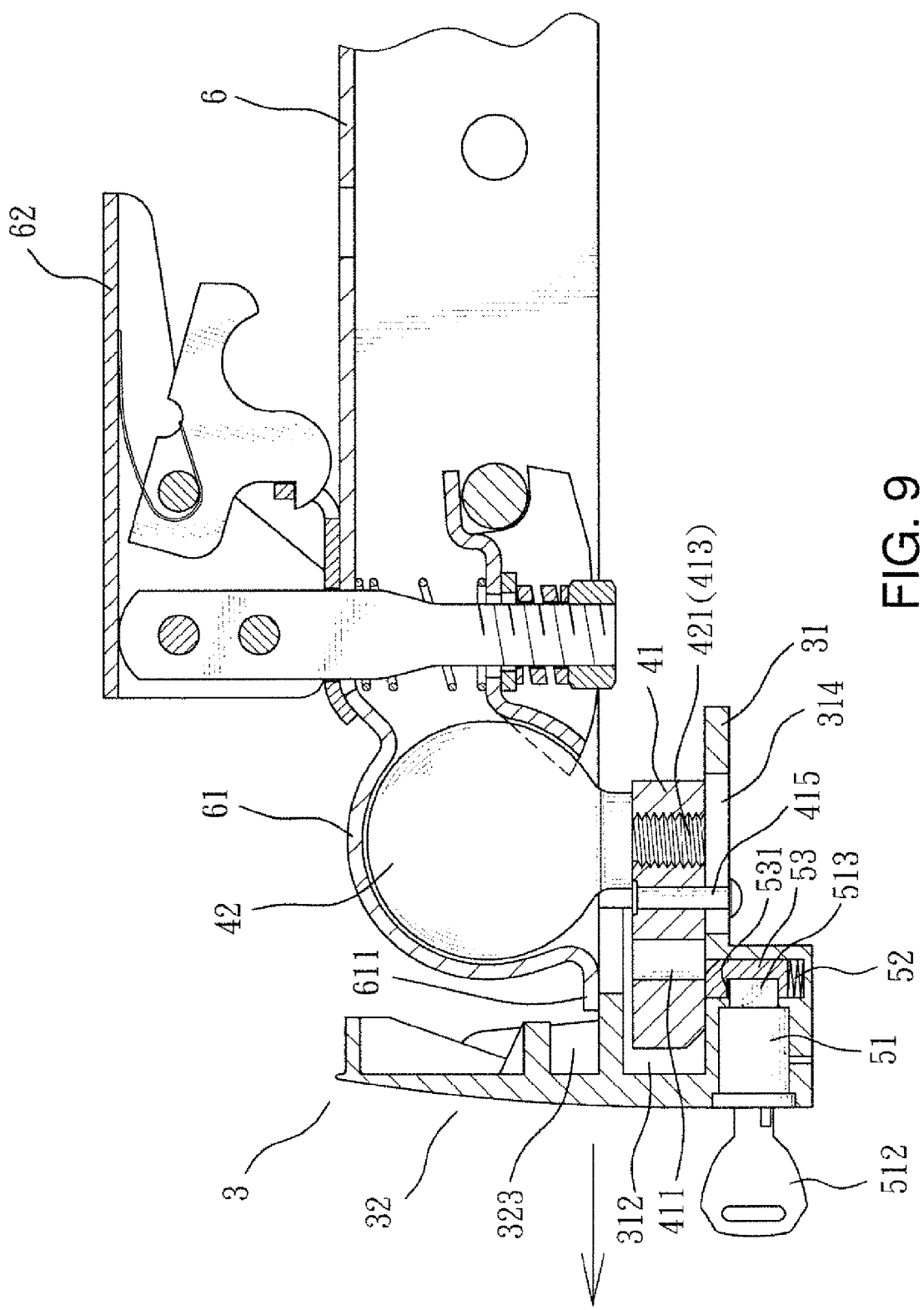
FIG. 9 is a sectional view of an embodiment of the invention in an unlocking condition.

The lock assembly 5 aims to control coupling and separation of the coupling assembly 4 and the locking dock 3, and includes:

a core 51 which has a keyway 511 at one side (referring to FIG. 6) to receive a key 512 (referring to FIG. 9) to lock and unlock the core 51 to drive a bolt 513 at a rear end of the core 51;

an elastic element 52 held in the latch chamber 315 of the locking dock 3; and a latch element 53 which is held in the latch chamber 315 and has the bottom pushing by the elastic element 52. It has a bolt chamber 531, and is driven by the bolt 513 of the core 51, and has an upper section 532 extended into the latch hole 411 of the slider 41 to prevent movement of the slider 41. The upper section 532 has a slant surface 533 corresponding to the chamfered corner 414 of the slider 41.

Figure 6:
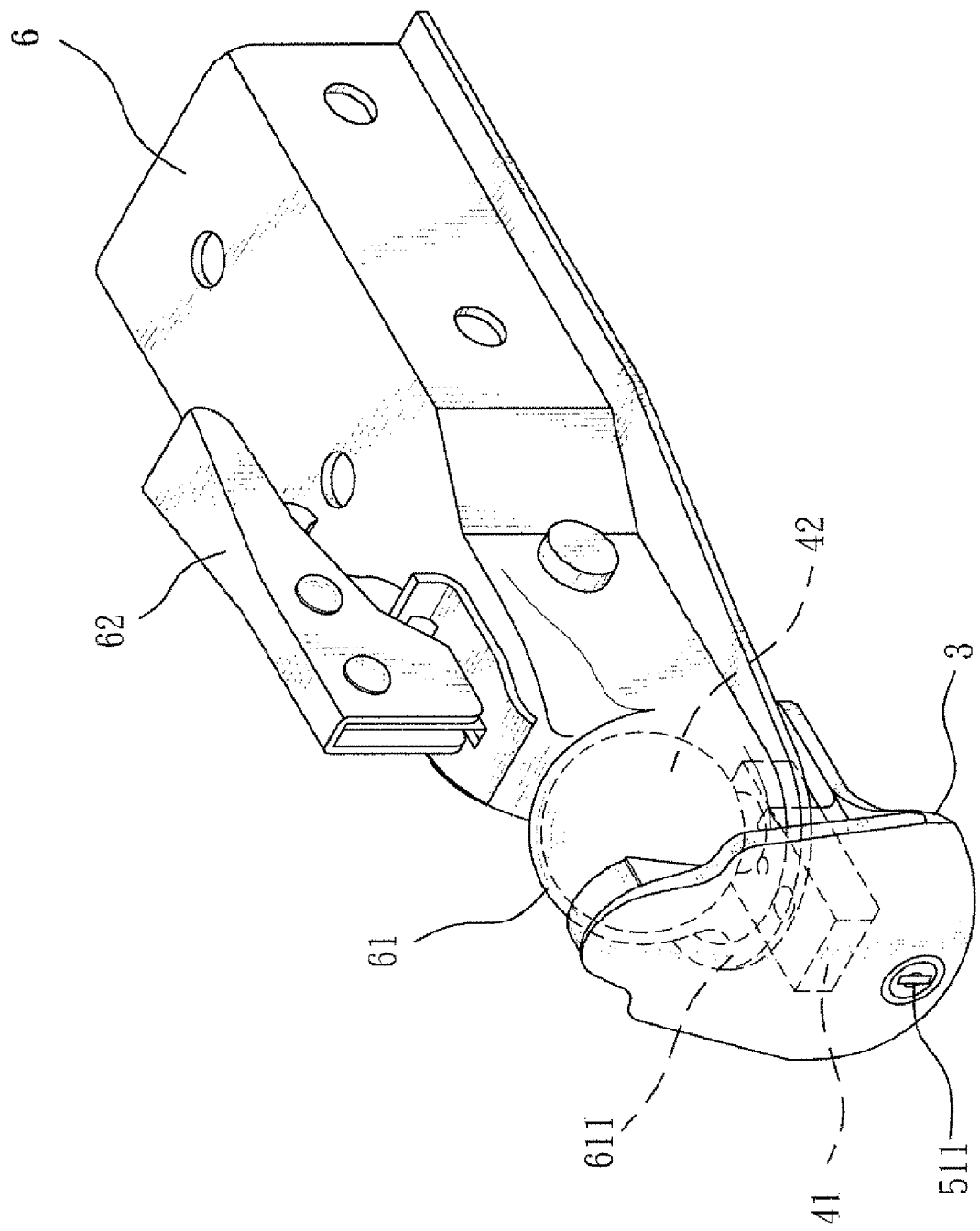
FIG. 6 is a perspective view of an embodiment of the invention.
Figure 7:
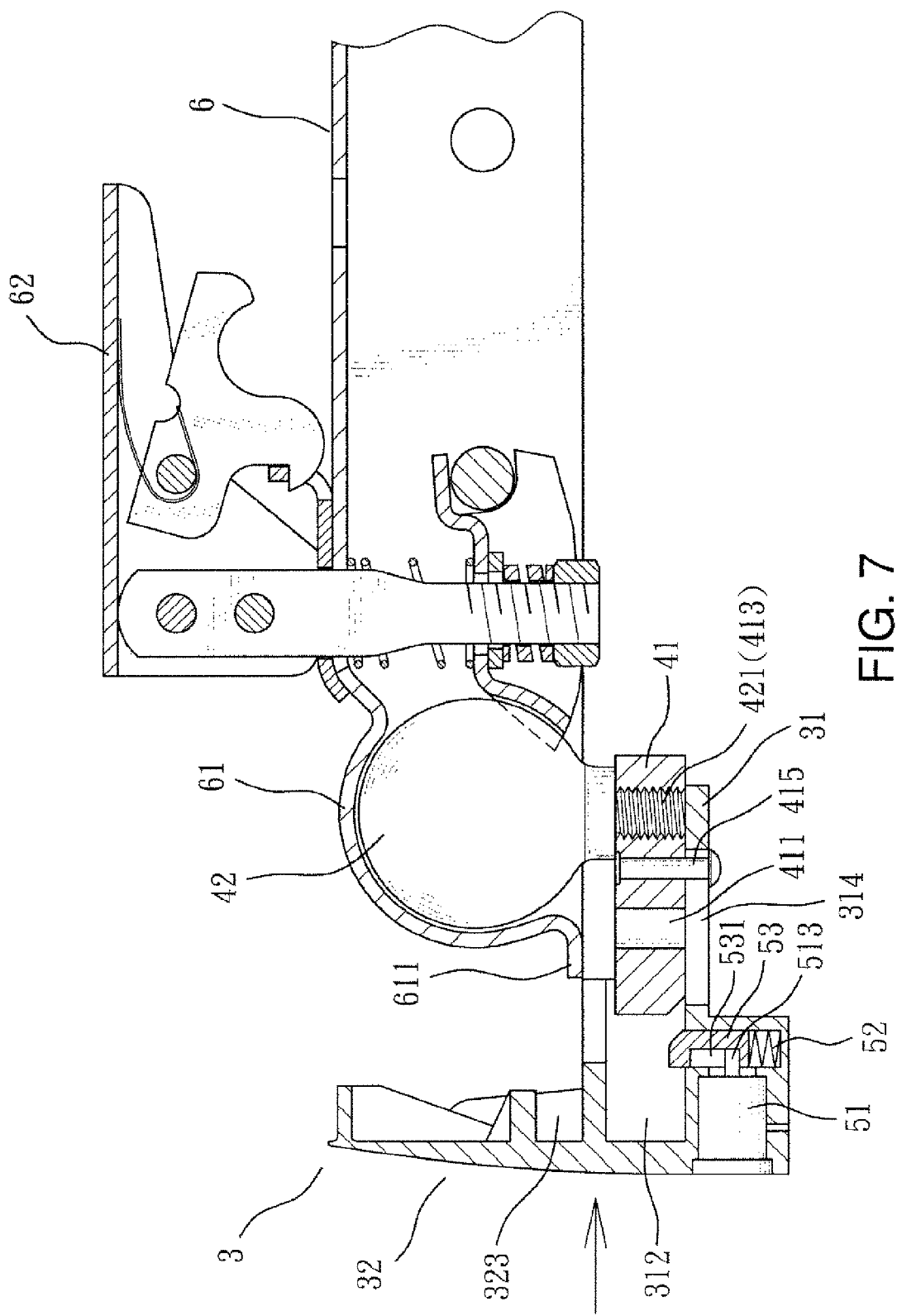
FIG. 7 is a sectional view of an embodiment of the invention.
Figure 8:
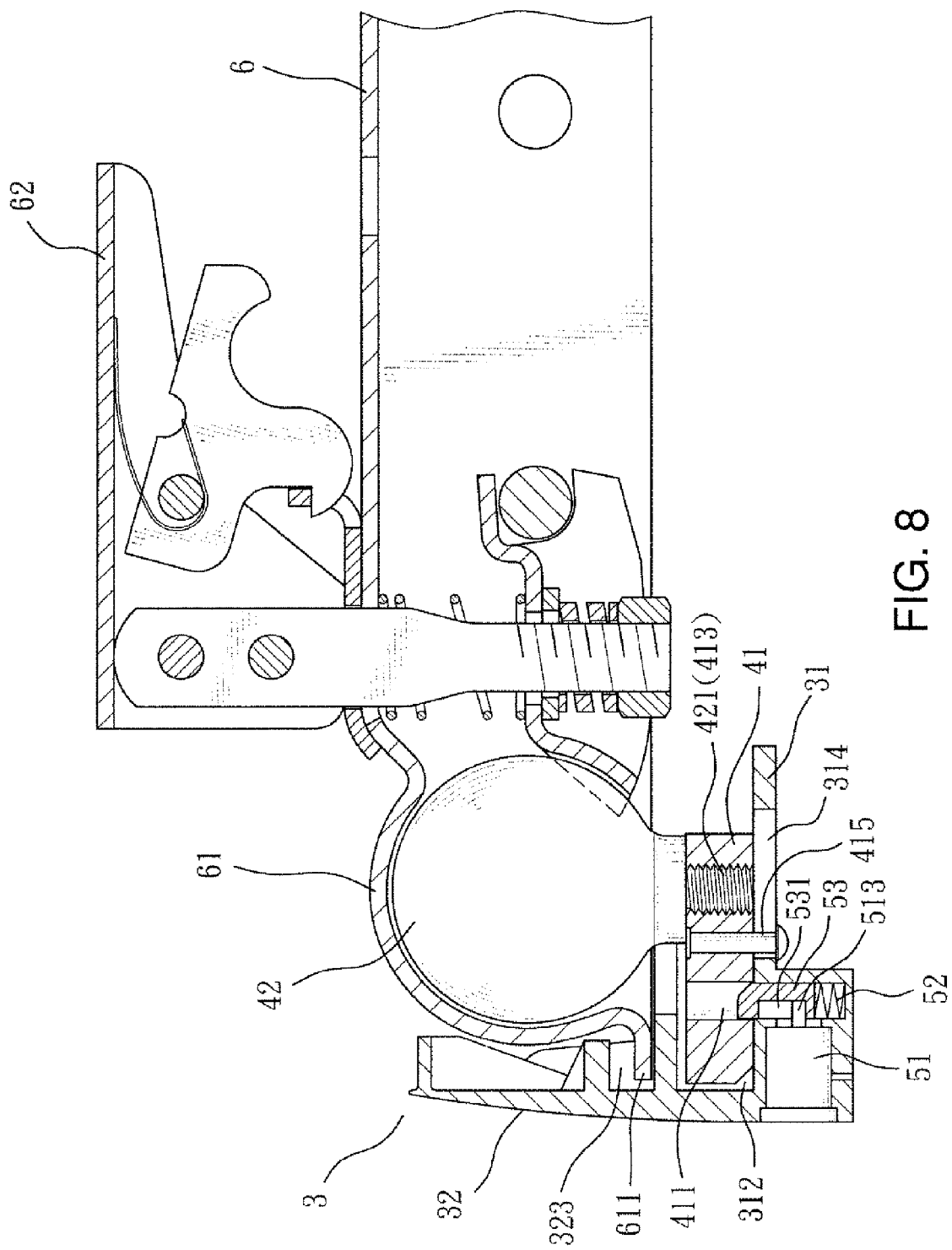
FIG. 8 is a sectional view of an embodiment of the invention in a locking condition.

By means of the construction set forth above, referring to FIGS. 6, 7 and 8, when a trailer is parked and not in use, the ball seat 42 of the coupling assembly 4 can be inserted in the dome 61 of the coupling dock 6. By pushing the side wall 32 the locking dock 3 can be moved towards the coupling dock 6 (while the coupling assembly 4 remains stationary), and the slider 41 and an edge 611 of the dome 61 are moved respectively into the slider room 312 and the coupling space 323 of the locking dock 3. Meanwhile, the latch element 53 is pushed downwards by the slider 41 to depress the elastic element 52, and the latch element 53 enters the latch chamber 315. After the slider 41 has slid into the slider room 312, and the latch hole 411 is overlapped with the latch chamber 315, the latch element 53 is pushed by the elastic element 52 so that the upper section 532 of the latch element 53 is extended into the latch hole 411 of the slider 41 (while the bolt 513 harnesses the latch element 53 to prevent it from escaping). Thus the slider 41 is blocked from moving, and the side wall 32 is close to the coupling dock 6 to form a locking condition (the coupling assembly 4 being inseparable from the dome 61 whether the handle 62 of the coupling dock 6 is unfastened or not). Hence the coupling dock 6 cannot be latched and towed away when proper authorization is not secured.

To do unlocking (referring to FIG. 9), drive the bolt 513 of the core 51 through the key 512, the latch element 53 and the elastic element 52 can be driven downwards so that the upper section 532 is no longer extended into the latch hole 411. By move the side wall 32 the locking dock 3 can be moved away from the coupling dock 6, and the slider 41 and dome 61 can be separated from the slider room 312 and the coupling space 323 to form an unlocking condition. Then the ball seat 42 of the coupling assembly 4 can be removed from the dome 61 of the coupling dock 6.

As a conclusion, when the trailer is in a parking condition, the coupling assembly can be held in the dome of the trailer coupling dock. Through locking and unlocking operation of the lock assembly the coupling assembly can be harnessed to prevent the trailer coupling dock from being latched or hauled away without proper authorization. Hence the trailer can be prevented from being stolen. It provides a significant improvement over the conventional techniques While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A trailer coupling dock theft-proof lock, comprising a locking dock, a coupling assembly and a lock assembly, wherein:
   the locking dock has a body with a deck formed thereon and a slider room formed inside; the deck having a slot and a latch chamber, the body having a core chamber at the bottom thereof communicating with the latch chamber;
   the coupling assembly includes:
      a slider which has at least one latch hole, a through hole and a coupling hole, and is retained on the locking dock through a pin running through the slot to engage with the through hole; and
      a ball seat which is coupled with the slider and held in a corresponding dome of a trailer coupling dock and replaceable according to the size of the dome; and
   the lock assembly includes:
      a core which is held in the core chamber and has a bolt at a rear end thereof;
      an elastic element held in the latch chamber of the locking dock; and
      a latch element which is held in the latch chamber and has the bottom thereof pushed by the elastic element and a bolt chamber and an upper section extended into the latch hole of the slider.

2. The trailer coupling dock theft-proof lock of claim 1, wherein the slider room has a notch at an upper side thereof.

3. The trailer coupling dock theft-proof lock of claim 1, wherein the body of the locking dock has a side wall, a harness flange on the side wall and a plank located above the slider room, the harness flange and the plank forming a coupling space between them.

4. The trailer coupling dock theft-proof lock of claim 1, wherein the slider has a chamfered corner at one side thereof.

5. The trailer coupling dock theft-proof lock of claim 1, wherein the upper section of the latch element has a slant surface.

6. The trailer coupling dock theft-proof lock of claim 1, wherein the ball seat has a thread section to engage with the coupling hole of the slider.

* * * * *